United States Patent
Garth et al.

(10) Patent No.: US 6,678,701 B1
(45) Date of Patent: Jan. 13, 2004

(54) TECHNIQUE FOR ESTABLISHING A POINT OF CONSISTENCY IN A PARALLEL DATABASE LOADING SYSTEM

(75) Inventors: John Marland Garth, Gilroy, CA (US); James Alan Ruddy, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/477,922

(22) Filed: Jan. 5, 2000

(51) Int. Cl.[7] .............................................. G06F 17/30
(52) U.S. Cl. .......................... 707/201; 707/8; 707/10; 707/100; 709/106; 714/34
(58) Field of Search ........................ 707/10, 100, 200, 707/201; 709/106; 714/34

(56) References Cited

U.S. PATENT DOCUMENTS

| | | | | |
|---|---|---|---|---|
| 5,193,186 A | | 3/1993 | Tamaki et al. ............... 709/106 |
| 5,630,047 A | * | 5/1997 | Wang ........................... 714/15 |
| 5,706,489 A | | 1/1998 | Chi et al. ..................... 712/228 |
| 5,712,971 A | | 1/1998 | Stanfill et al. ................ 714/34 |
| 5,721,909 A | * | 2/1998 | Oulid-Aissa et al. ......... 707/10 |
| 5,761,667 A | * | 6/1998 | Koeppen .................... 707/101 |
| 5,832,283 A | * | 11/1998 | Chou et al. .................. 713/300 |
| 5,867,725 A | | 2/1999 | Fung et al. .................... 712/23 |
| 5,902,352 A | * | 5/1999 | Chou et al. .................. 709/102 |
| 6,065,123 A | * | 5/2000 | Chou et al. .................. 713/322 |
| 6,192,365 B1 | * | 2/2001 | Draper et al. ................ 707/101 |
| 6,442,663 B1 | * | 8/2002 | Sun et al. .................... 711/202 |

OTHER PUBLICATIONS

Tom Barclay, et al., "Loading Databases Using Dataflow Parallelism," Sigmond Record, vol. 23, No. 4, pp. 72–83, Dec. 1994.

AF Cardenas et al., "Performance of Recovery Architectures in Parallel Associative Database Processors," ACM Transactions on Database Systems, vol. 8, No. 3, pp. 291–323, Sep. 1983.

Dgupta, "Optimization Oracle7.1 Database Performance," http://www.fors.com/orasupp/rdbms/misc/16347_1.HTM, pp. 1–16, Nov. 4, 1994.

LOADPLUS for DB2* Reference Manual, Version 4.1, total of 8 pages, Sep. 30, 1997.

* cited by examiner

Primary Examiner—Shahid Alam
(74) Attorney, Agent, or Firm—Gates & Cooper LLP

(57) ABSTRACT

A technique for loading data into a data store connected to a computer. Under control of a main process, multiple agent load processes are started for loading data in parallel. The main process awaits receipt of a checkpoint signal from each agent load process. Then, upon receiving the checkpoint signal from each load process, the main process performs a checkpoint.

21 Claims, 5 Drawing Sheets

TECHNIQUE FOR ESTABLISHING A POINT OF CONSISTENCY IN A PARALLEL DATABASE LOADING SYSTEM

BACKGROUND OF THE INVENTION

1. Field of the Invention

This invention relates in general to computer-implemented database systems, and, in particular, to establishing a point of consistency (i.e., a checkpoint) in a load operation in a parallel database loading system, from which point the load operation may be restarted in case of, for example, failure of the operation.

2. Description of Related Art

Databases are computerized information storage and retrieval systems. A Relational Database Management System (RDBMS) is a database management system (DBMS) that uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

A table can be divided into partitions, with each partition containing a portion of the table's data. Each partition may reside on a different data storage device. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

Some systems have very large databases, storing data on the order of terrabytes of information. With the growing use of computers and the increased types of data that is stored on a storage device (e.g., images and audio, as well as large amounts of text), such large databases are becoming more and more common. Loading that amount of data from an input source into a database management system (DBMS) can take many hours. Traditionally, database loading systems (also referred to as "load utilities") periodically checkpoint a status during the loading process. A checkpoint is a point in a process at which time all input/output (I/O) activity is halted and state information is stored. In particular, the state information includes a location in an input file at which loading of data is to be restarted, a location at a tablespace in which data is to be written upon restart, and error information. If any error occurs before the loading is complete, the load utility can be restarted at the last checkpoint, rather than at the beginning of the input file. Since the load utility does not have to start processing from the beginning of the input file, a great deal of time is saved.

In an attempt to speed up the loading of data, various approaches have been tried involving the use of parallel processing. Parallel processing exploits the multiprocessor capabilities of modern high speed computers and refers to the use of several processors to load data into different parts of the database in parallel with each other. That is, data is loaded into different partitions of a database by load utilities that are executing concurrently. In particular, the data to be loaded into the database may be separated into multiple input files. Then, a load utility may load data into a tablespace (i.e., read data from an input file and store the data in a tablespace).

However, loading the data in parallel greatly complicates the ability to do checkpoints and restart the load after a failure. With multiple processors reading input data from different input sources and loading the data into different parts of a database, it is difficult to establish a checkpoint that enables a consistent point of restart for the multiple processors. In particular, this requires coordination between all of the processes performing the load. Conventional load utilities that load data in parallel often require that data be reloaded starting from the beginning of a partition, rather than at a checkpoint.

Therefore, there is a need in the art for an improved method of establishing a checkpoint during a load operation in a parallel database loading system.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented technique for establishing a checkpoint during a load operation in a parallel database loading system.

In accordance with the present invention, under control of a main process, multiple agent load processes are started for loading data in parallel. The main process awaits receipt of a checkpoint signal from each agent load process. Then, upon receiving the checkpoint signal from each load process, the main process performs a checkpoint for all agent load processes.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
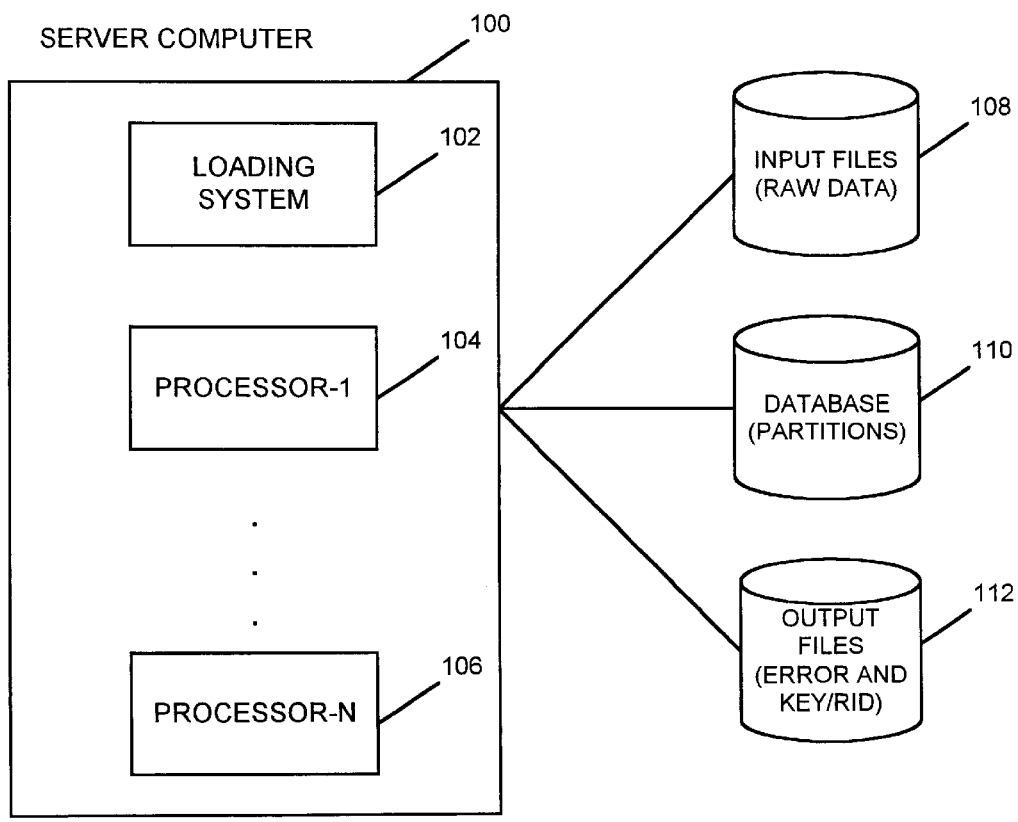
FIG. 1 is a diagram illustrating a computer hardware environment that could be used in accordance with the present invention.

FIG. 1 is a diagram illustrating a computer hardware environment that could be used in accordance with the present invention. A computer server 100 comprises a loading system 102 and multiple processors (Processor-1 104 and Processor-N 106). The computer server 100 is connected to data stores, including data store 108, which stores input files of raw data to be stored into a database, data store 110, which stores partitions of a database, and data store 112, which stores output files for holding error information and key/RID information. Under the direction of the loading system 102, a load process at each processor 104, 106 loads data from an input file 108 into a database 110, while storing information in the output files 112. Although the input file, the database, and the output files have been illustrated at different data stores, it is to be understood that they may all be stored on one data store or in some combination at multiple data stores (e.g., with the input and output files at one data store and the database at another data store).

Figure 2:
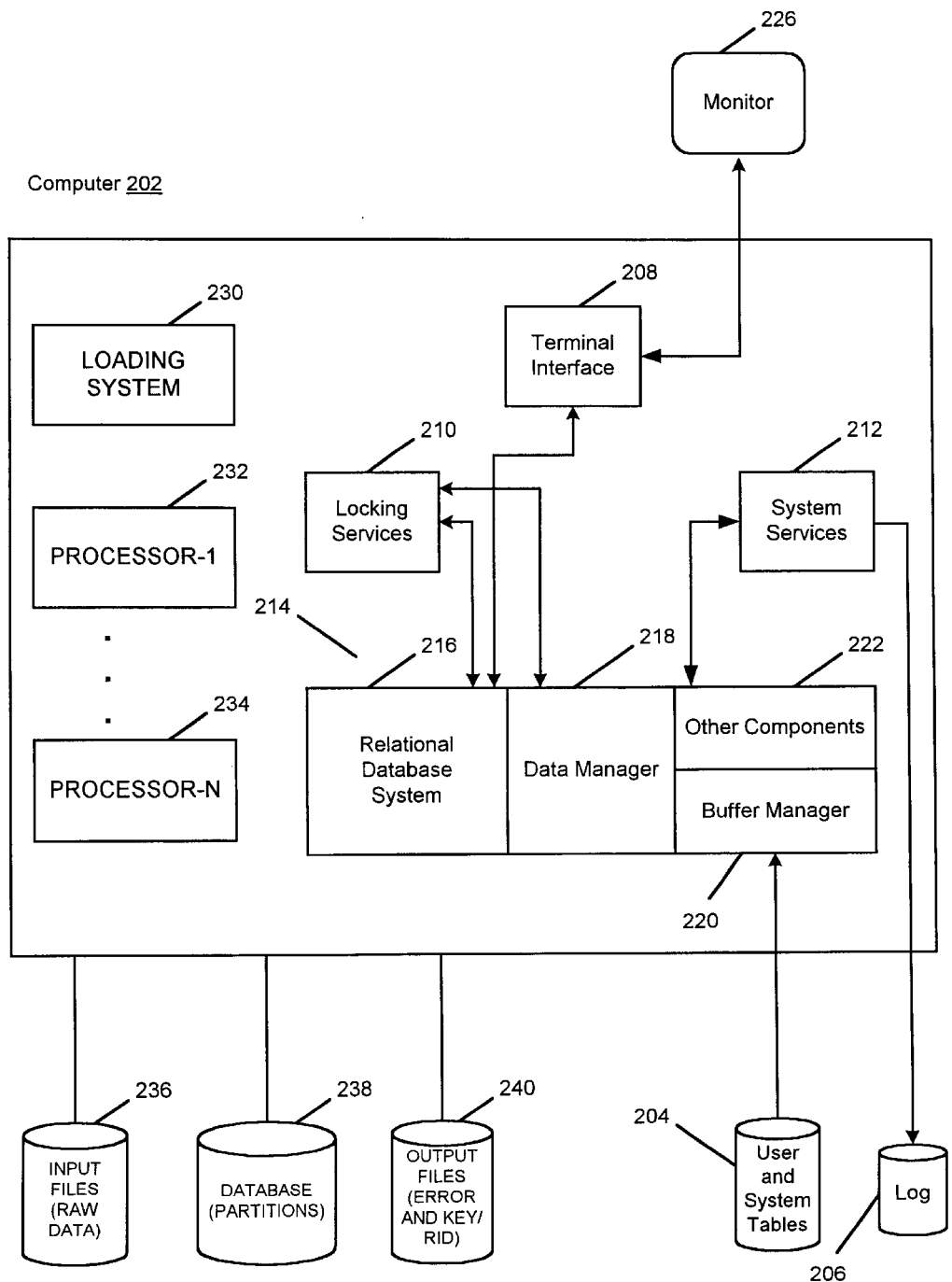
FIG. 2 is a diagram illustrating a computer hardware environment that adds further detail to the hardware environment of FIG. 1.

FIG. 2 is a diagram illustrating a computer hardware environment that adds further detail to the hardware environment of FIG. 1. In the environment, a computer system 202 is comprised of one or more processors connected to one or more data storage devices 204 and 206 that store one or more relational databases in tablespaces. The data storage devices 204 and 206 may comprise a fixed or hard disk drive, a floppy disk drive, a CDROM drive, a tape drive, or other device.

Operators of the computer system 202 use a standard operator interface 208, such as IMS/DB/DC®, CICS®, TSO®, OS/390®, ODBC® or other similar interface, to transmit electrical signals to and from the computer system 202 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In an embodiment of the present invention, the RDBMS software comprises the DB2® product offered by IBM for the OS/390® operating systems. Those skilled in the art will recognize, however, that the present invention has application program to any RDBMS software, whether or not the RDBMS software uses SQL.

As illustrated in FIG. 2, the DB2® system for the OS/390® operating system includes three major components: the Internal Resource Lock Manager (IRLM) 210, the Systems Services module 212, and the Database Services module 214. The IRLM 210 handles locking services for the DB2® system, which treats data as a shared resource, thereby allowing any number of users to access the same data simultaneously. Thus concurrency control is required to isolate users and to maintain data integrity. The Systems Services module 212 controls the overall DB2® execution environment, including managing log data sets 206, gathering statistics, handling startup and shutdown, and providing management support.

At the center of the DB2® system is the Database Services module 214. The Database Services module 214 contains several submodules, including the Relational Database System (RDS) 216, the Data Manager 218, the Buffer Manager 220, and other components 222 such as an SQL compiler/interpreter. These submodules support the functions of the SQL language, i.e. definition, access control, interpretation, compilation, database retrieval, and update of user and system data, and the submodules support utility functions such as copy, recover, reorganization, and load of user and system data.

The computer system 202 comprises a loading system 230 and multiple processors (Processor-1 232 and Processor-N 234). The computer system 202 is also connected to a data store 236, which stores input files of raw data to be stored into a database, data store 238, which stores a database, and data store 240, which stores output files for holding error information and key/RID information.

The present invention is generally implemented using load control statements executed under the control of the Database Services module 214. The Database Services module 214 retrieves or receives the load control statements, wherein the load control statements are generally stored in a text file on the data storage devices 204 and 206 or are interactively entered into the computer system 202 by an operator sitting at a monitor 226 via operator interface 208. The Database Services module 214 then derives or synthesizes instructions from the load control statements for execution by the computer system 202.

Generally, the RDBMS software, the load control statements, and the instructions derived therefrom, are all tangibly embodied in a computer-readable medium, e.g. one or more of the data storage devices 204 and 206. Moreover, the RDBMS software, the load control statements, and the instructions derived therefrom, are all comprised of instructions which, when read and executed by the computer system 202, causes the computer system 202 to perform the steps necessary to implement and/or use the present invention. Under control of an operating system, the RDBMS software, the load control statements, and the instructions derived therefrom, may be loaded from the data storage devices 204 and 206 into a memory of the computer system 202 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 2 is not intended to limit the present invention. Indeed, those skilled in the art will recognize that other alternative hardware environments may be used without departing from the scope of the present invention.

A Technique for Consistent Restart In a Parallel Database Loading System

An embodiment of the invention provides a parallel database loading system ("loading system"). The loading system provides a technique for establishing points of consistency (i.e., checkpoints) across multiple loading agents during a loading operation. The state information saved at these checkpoints may then be used to restart the loading operation after, for example, a failure. In particular, a main load process in the loading system invokes multiple agent load processes on multiple processors. The agent load processes execute concurrently. Each agent load process loads data from one or more input sources to one or more output sources. In one embodiment, one load process does not share an input source or output source with another load process. Then, each agent load process signals the main load process when it has reached a checkpoint or completed loading a part of the database. The main load process handles the signals from each agent load process to determine whether to perform a checkpoint. When a checkpoint is to be performed, the main load process performs the checkpoint across the multiple processors. Then, the main load process restarts each of the agent load processes. Additionally, the main load process may assign an agent load process that has completed loading a part of the database, without reaching a checkpoint, another part of the database to load. The main process restarts this agent load process.

Figure 3:
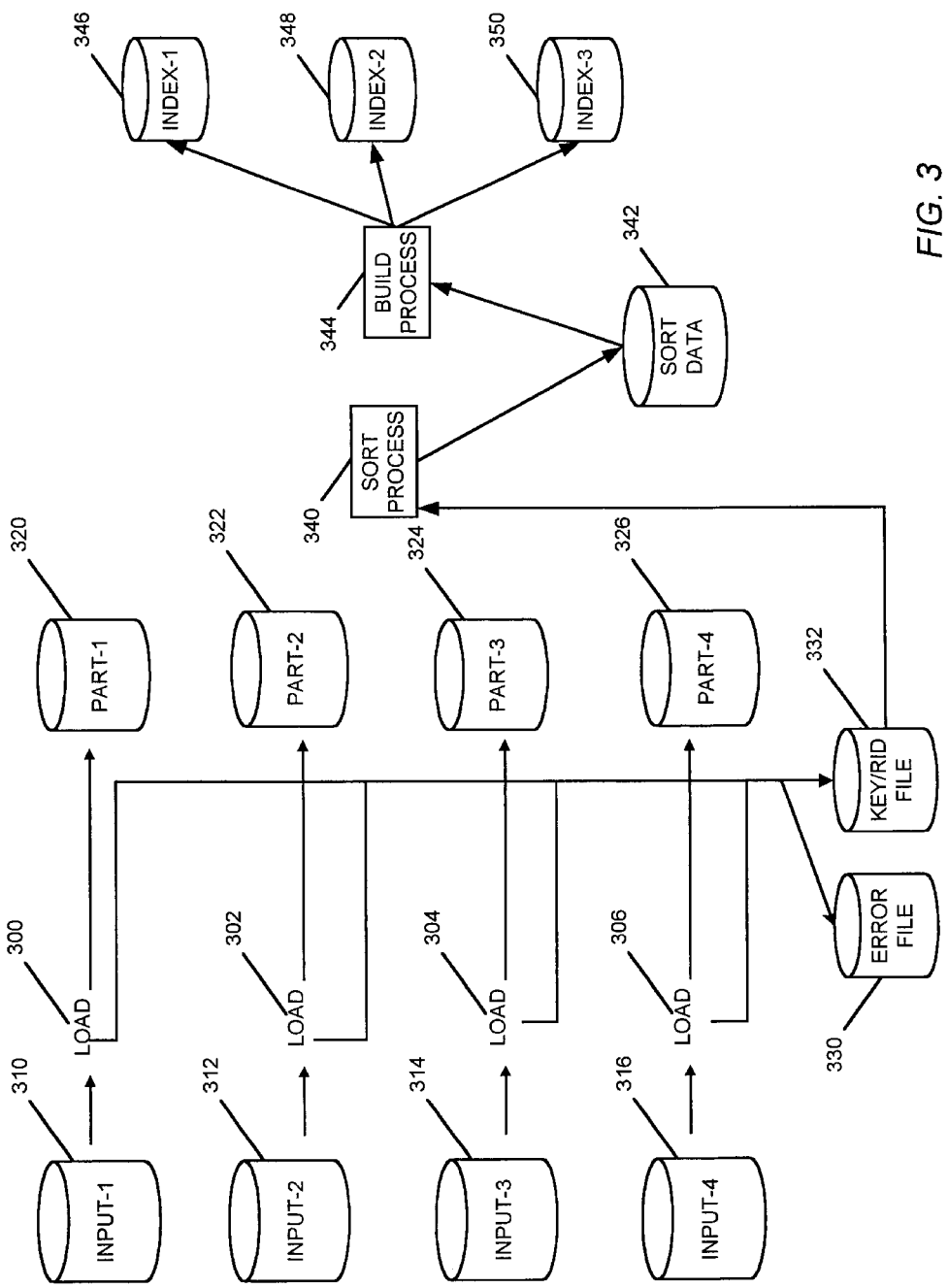
FIG. 3 is a diagram illustrating a parallel database loading system.

FIG. 3 is a diagram illustrating a parallel database loading system. For each agent load process 300, 302, 304, and 306, the process of loading data into a database typically involves reading an input file of "raw" data 310, 312, 314, and 316, prepared, for example, by a program or by a user. In the example of FIG. 3, each agent load process 300, 302, 304, and 306 reads from a different input source of raw data 310, 312, 314, and 316. Next, the raw data in each input record is converted into a format suitable for storing in the database (e.g., converted into binary or hexadecimal). Then, the individual fields (e.g., columns) are combined into a form (e.g., a row) stored in the database. In particular, the raw data may not supply information for every column of a row or may supply the information for columns in an order that does not follow the ordering of columns in a row in the database. Therefore, each agent load process 300, 302, 304, and 306 combines the data into the proper format (e.g., orders data to following the ordering of columns in a row in the database).

Once this is done, each agent load process 300, 302, 304, and 306 stores data into a separate part of the database 320, 322, 324, and 326 (e.g., a partition or a tablespace). In particular, each agent load process 300, 302, 304, and 306 stores a row at a particular location in the database with a row identifier (RID). Additionally, each agent load process 300, 302, 304, and 306 writes records into one or more output files 330 and 332 for later processing. These records can represent, for example, information on errors encountered during the data conversion, or key and RID (i.e., row identifier) information used to build indexes on the database. A key is a field or attribute of a table that is used for indexing into the table or for sorting records in the table (e.g., a social security number stored in a column of a table of employee information may be used as a key).

After the data is loaded into the database 320, 322, 324, and 326, key and RID information is sorted 340, and the sorted information is stored 342. Next, a build index process 344 builds indexes 346, 348, and 350.

When a database load utility uses parallel processing, each agent load process typically reads from one or more input files, loads the data into one or more parts of the database, and writes information to one or more output files. Also, more than one load process can write information to a given output file, although this is not necessary.

In some conventional systems, a load process will typically checkpoint its own work. On the other hand, with the loading system, the main process checkpoints work for all agent load processes. While loading data, an agent load process determines that it has reached a checkpoint after processing some fixed number of input records (e.g., a checkpoint every 100,000 records). In one embodiment, each agent load process has the same checkpoint. However, it is to be understood that different agent load processes may have different checkpoints, based, for example, on the speed of each processor.

Each agent load process notifies the main process when it reaches its checkpoint. To take the checkpoint, the main process will quiesce all I/O activity on the input sources (i.e., the raw data files), the database, and other output sources (e.g., the error file and the key/RID file). Once I/O activity is halted, the main process saves information on the current position of each agent load process within the database and within all input and output files. The position in the database (RID), and the positions in the input file and output files (a record number, typically) are saved at a point of consistency to enable a restart from those same positions.

With parallel load processes, the problems lie in (a) establishing a point at which all I/O from all load processes to all data sources can be quiesced to create a point of consistency for the restart, (b) without creating inefficiencies in the load process by causing one or more of the agent load processes to wait for a long period of time.

To solve these problems, the loading system uses a main (or "parent") process to open all files to be used, to start the processes that will do the actual loading of data (i.e., the agent load processes), and to wait for each of the agent load processes to signal the main process with status information.

The agent load process will signal the main process whenever the agent load process has processed enough records that a checkpoint is needed (e.g., 100,000 records), or when it has finished loading all records into a part of the database (e.g., a partition or a tablespace), without reaching the checkpoint, and is available for loading data into the next part. When the agent load process is available to load another part of the database, it may or may not have exhausted loading the data in its associated input files. Note that the agent load process of the DBMS has a checkpointing capability.

If the main process receives a signal indicating that an agent load process has not reached a checkpoint but has finished loading data into a part of the database, the main process assigns a new part to the agent load process and signals the agent load process to continue loading to the new part. Then, the agent load process continues to load data into the new part until reaching a checkpoint or until loading of that part is completed without reaching a checkpoint.

If the main process receives a signal indicating that the agent load process has reached a checkpoint, then the main process determines whether each of the agent load processes has signaled that the agent load process has reached a checkpoint. If all of the agent load processes have reached a checkpoint, they are now waiting (i.e., no new I/O request can be issued), so the main process quiesces I/O activity to all files, records the checkpoint, and signals all of the waiting processes to continue. If all of the agent load processes have not reached a checkpoint, the main process waits for the next agent load process to signal that it has reached a checkpoint.

The following is example pseudocode for the tasks performed by the loading system, under control of a main process.

```
Open all files
Start all agent load processes
Wait for a signal from any agent load process
Do until no more data to load
  If signal received is a request for next part then
    If more parts to load then
      Signal agent load process to continue loading with
        next part
    Else
      Terminate agent load process
  Else (signal received is for checkpoint)
```

Figure 4:
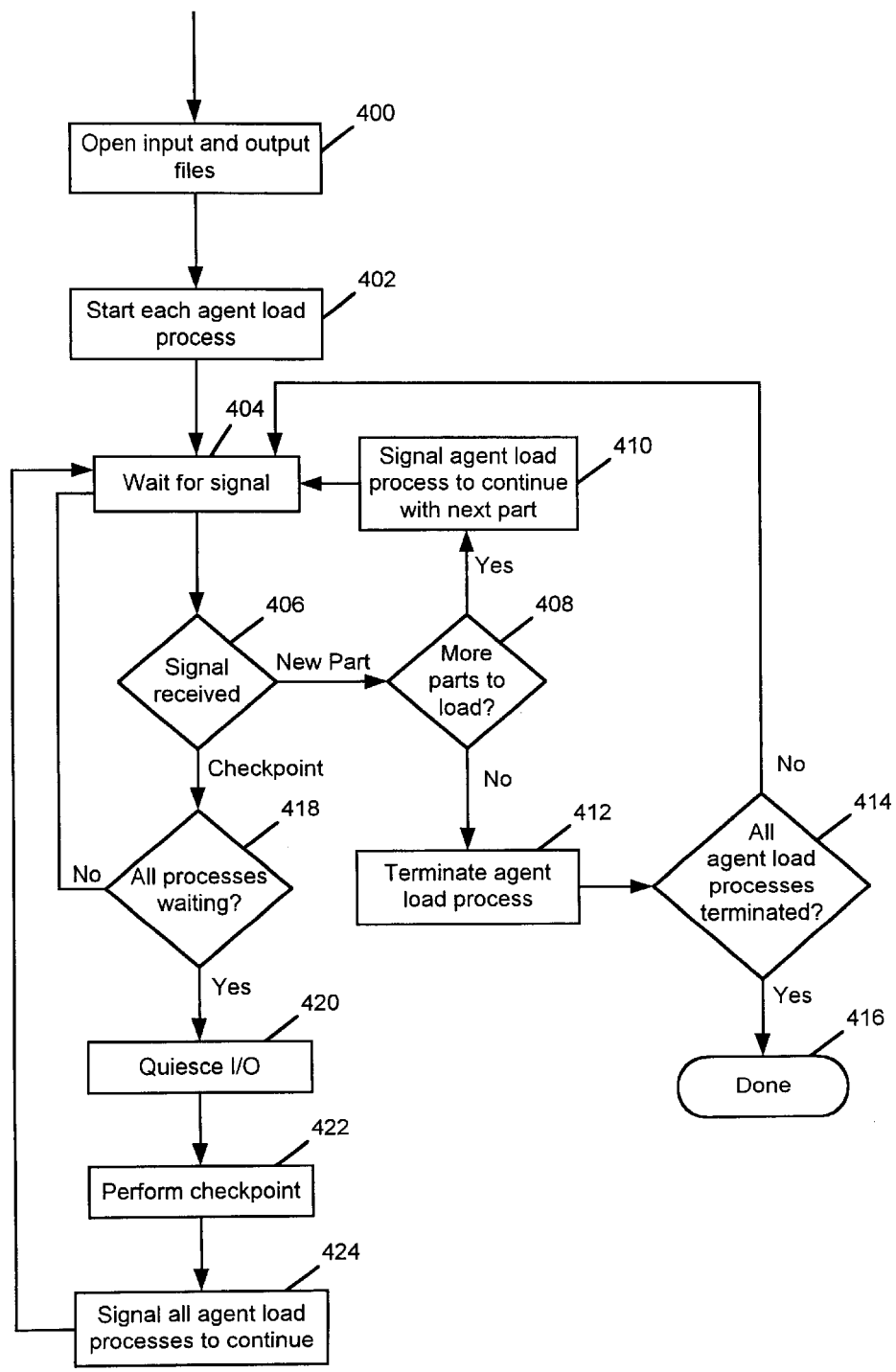
FIG. 4 is a flow diagram illustrating steps performed by a main process under the direction of the loading system.

If all agent load processes are waiting for checkpoint
  then
    Quiesce I/O to all files
    Perform checkpoint
    Signal all agent load processes to continue
  Else
    Wait for the next agent load process to signal
End FIG. 4 is a flow diagram illustrating steps performed by a main process under the direction of the loading system 102. The main process opens input and output files in block 400. In particular, the input files contain raw data, and the output files include one or more error files for storing error messages and one or more key/RID files for storing keys and row identifiers that will be used to build indexes. In block 402, the main process starts each agent load process. In block 404, the main process waits for a signal from an agent load process.

Upon receiving a signal in block 406, the main process determines whether the signal indicates an availability signal from an agent load process indicating that the agent load process has completed loading its assigned part of the database without reaching its checkpoint. If so, the main process continues to block 408, otherwise, the main process continues to block 418.

In block 408, the main process determines whether there are more parts of the database to be loaded. If so, the main process continues to block 410, otherwise, the main process continues to block 412. In block 410, the main process assigns a new part (e.g., a partition or tablespace) to the agent load process, so that the agent load process can continue loading data into the database, and signals the agent load process to continue with the next part. Next, the main process continues to block 404, where it waits for the next signal from an agent load process. In block 412, since there are no more parts of the database to be loaded, the main process terminates the agent load process and proceeds to block 414, where it determines whether all agent load processes have been terminated. If not, the main process continues to block 404 to wait for the next signal from an agent load process, otherwise, the main process is done in block 416.

In block 418, the main process determines whether all agent processes are waiting for a checkpoint. If so, the main process continues to block 420, otherwise, the main process loops back to block 404. In block 420, the main process quiesces all input and output actions. In block 422, the main process performs a checkpoint. In block 424, the main process signals all agent load processes to continue loading and loops back to block 404.

The following is example pseudocode for the tasks performed by the loading system, under control of an agent load process.

Figure 5:
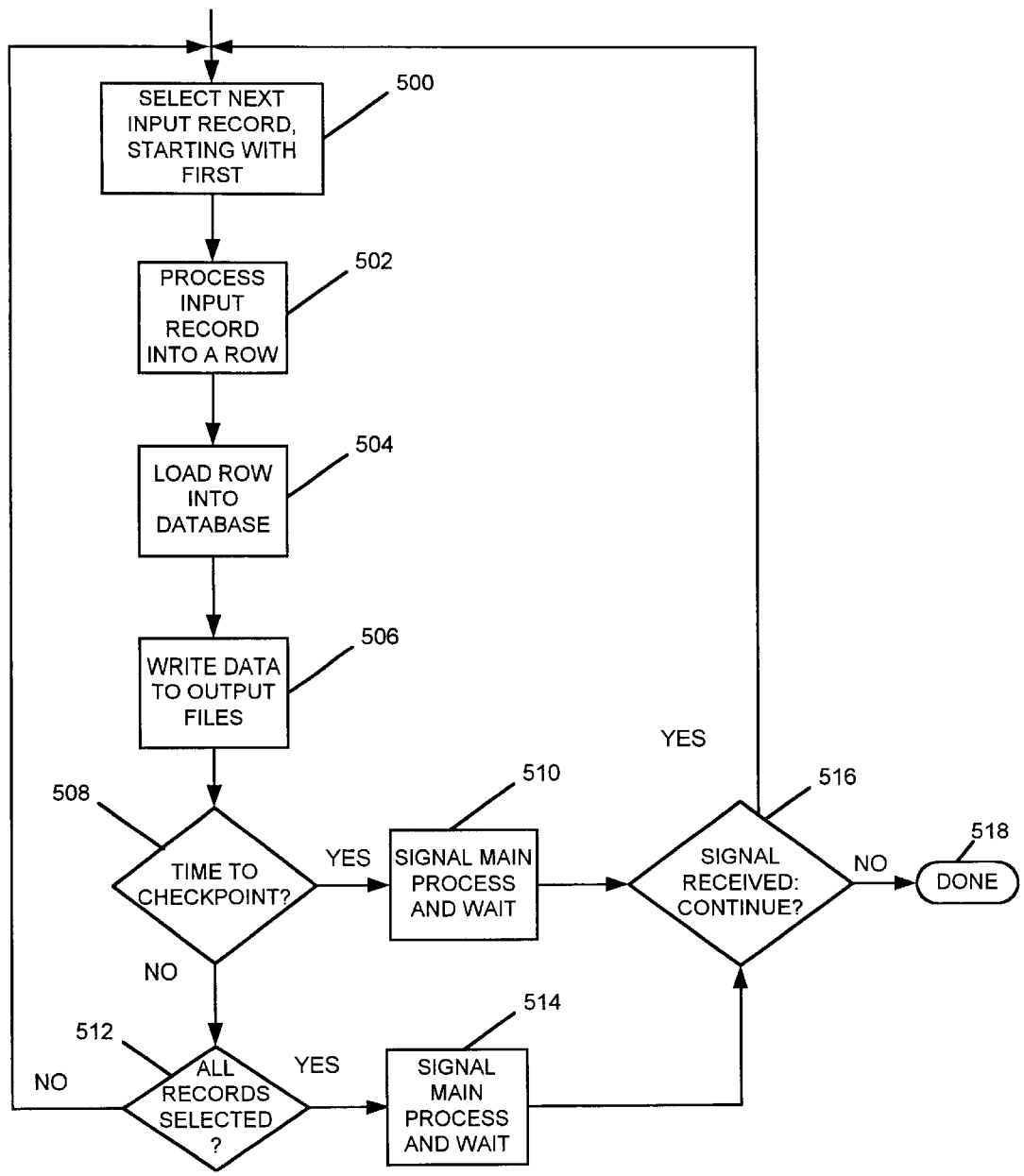
FIG. 5 is a flow diagram illustrating steps performed by an agent load process under the direction of the loading system.

Read an input record
While more to do
Convert data and build row
Place row in database
Write output record(s)
If time to checkpoint
  Signal main process for checkpoint
  Wait for main process to signal back
If at end of part
  Signal main process for more work
  Wait for main process to signal back
Read next record
End FIG. 5 is a flow diagram illustrating steps performed by an agent load process under the direction of the loading system 102. In block 500, the agent load process selects the next input record, starting with the first input record in its assigned data file. In block 502, the agent load process processes the input record into a row. This may require reorganizing the data for the record and converting the data into a particular format. In block 504, the agent load process loads the row into its assigned part of the database. In block 506, the agent load process writes data to one or more output files, including an errors file and a key/RID file.

In block 508, the agent load process determines whether it is at a checkpoint. If so, the agent load process continues to block 510, otherwise, the agent load process continues to block 512. In block 510, the agent load process signals the main process that it has reached a checkpoint and waits for a signal from the main process.

In block 512, the agent load process determines whether it has completed loading its assigned part of the database without reaching its checkpoint (i.e., whether all records have been selected). If so, the agent load process continues to block 514, otherwise, the agent load process loops back to block 500. In block 514, the agent load process signals the main process that it is available to process additional data and waits for a signal from the main process.

When the agent load process receives a signal from the main process at block 516, the agent load process determines whether the main process has signaled it to continue loading data or to terminate. If the signal is to continue, the agent load process loops back to block 500, otherwise, the agent load process is done at block 518. At block 500, the agent load process selects the next record of its assigned part, starting with the first, if it has been assigned a new part.

The agent load processes determine when to checkpoint after, for example, processing some fixed number of records. On a symmetric multi-processor, each agent load process will run at approximately the same speed, so all of the agent load processes will issue the checkpoint signal to the main process at approximately the same time. Thus, one advantage of the invention is that the main process can perform the checkpoint efficiently, without having to delay many agent load processes while waiting for one to finish.

Additionally, if an agent load process finishes loading its part of the database before it reaches its checkpoint threshold, the agent load process can be assigned another part of the database to load and continue processing until it does reach its checkpoint threshold (counting all records loaded into all parts during the checkpoint interval). Thus, another advantage of the invention is that all agent load processes are kept as busy as possible (e.g. if an agent load process finishes its first part after loading only 10,000 records, it can load 90,000 records into another part before requesting a checkpoint, instead of having to remain idle while waiting for other agent load processes to reach a checkpoint).

CONCLUSION

This concludes the description of an embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of loading data into a data store connected to a computer, the method comprising the steps of:
   under control of a main process,
   executing multiple agent load processes for loading data in parallel into a database;
   awaiting receipt of a checkpoint signal from each agent load process; and
   upon receiving the checkpoint signal from each agent load process, performing a checkpoint in the main process for all agent load processes.

2. The method of claim 1, further comprising, after performing a checkpoint, restarting each agent load process.

3. The method of claim 1, further comprising:
   receiving an availability signal from an agent load process; and
   assigning the agent load process an additional part of the database to load.

4. The method of claim 3, further comprising:
   determining whether there is additional data to be loaded into additional parts of the database; and
   when it is determined that there is additional data to be loaded into additional parts of the database, assigning an additional part of the database to the agent load process.

5. The method of claim 3, further comprising:
   under control of each agent load process,
   determining when it is available to load data into an additional part of the database; and
   transmitting an availability signal to the main process.

6. The method of claim 1, further comprising:
   under control of each agent load process,
   determining when a checkpoint should occur; and
   transmitting a checkpoint signal to the main process indicating that a checkpoint should occur.

7. The method of claim 1, wherein performing a checkpoint further comprises:
   halting all input and output activities; and
   storing state information.

8. An apparatus for loading data, comprising:
   a computer having a data store coupled thereto, wherein the data store stores data; and
   one or more computer programs, performed by the computer, for, under control of a main process, executing multiple agent load processes for loading data in parallel into a database, awaiting receipt of a checkpoint signal from each agent load process, and upon receiving the checkpoint signal from each agent load process, performing a checkpoint in the main process for all agent load processes.

9. The apparatus of claim 8, further comprising, after performing a checkpoint, resting each agent load process.

10. The apparatus of claim 9, further comprising:
    receiving an availability signal from an agent load process; and
    assigning the agent load process an additional part of the database to load.

11. The apparatus of claim 10, further comprising:
    determining whether there is additional data to be loaded into additional parts of the database; and
    when it is determined that there is additional data to be loaded into additional parts of the database, assigning an additional part of the database to the agent load process.

12. The apparatus of claim 10, further comprising:
    under control of each agent load process,
    determining when it is available to load data into an additional part of the database; and
    transmitting an availability signal to the main process.

13. The apparatus of claim 8, further comprising:
    under control of each agent load process,
    determining when a checkpoint should occur; and
    transmitting a checkpoint signal to the main process indicating that a checkpoint should occur.

14. The apparatus of claim 8, wherein performing a checkpoint further comprises:
    halting all input and output activities; and
    storing state information.

15. An article of manufacture comprising a program storage medium readable by a computer and embodying one or more instructions executable by the computer to perform method steps for loading data into a data store connected to the computer, the method comprising the steps of:
    under control of a main process,
    executing multiple agent load processes for loading data in parallel into a database;
    awaiting receipt of a checkpoint signal from each agent load process; and
    upon receiving the checkpoint signal from each agent load process, performing a checkpoint in the main process for all agent load processes.

16. The article of manufacture of claim 15, further comprising, after performing a checkpoint, restarting each agent load process.

17. The article of manufacture of claim 15, further comprising:
    receiving an availability signal from an agent load process; and
    assigning the agent load process an additional part of the database to load.

18. The article of manufacture of claim 17, further comprising:
    determining whether there is additional data to be loaded into additional parts of the database; and
    when it is determined that there is additional data to be loaded into additional parts of the database, assigning an additional part of the database to the agent load process.

19. The article of manufacture of claim 17, further comprising:
    under control of each agent load process,
    determining when it is available to load data into an additional part of the database; and
    transmitting an availability signal to the main process.

20. The article of manufacture of claim 15, further comprising:
    under control of each agent load process,
    determining when a checkpoint should occur; and
    transmitting a checkpoint signal to the main process indicating that a checkpoint should occur.

21. The article of manufacture of claim 15, wherein performing a checkpoint further comprises:
    halting all input and output activities; and
    storing state information.

* * * * *